United States Patent
Zhang

(10) Patent No.: US 9,985,449 B2
(45) Date of Patent: May 29, 2018

(54) COMMUNICATION METHOD, POWER ADAPTER AND TERMINAL

(71) Applicant: Guang Dong Oppo Mobile Telecommunications Corp., Ltd., Dongguan, Guangdong (CN)

(72) Inventor: Jialiang Zhang, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days. days.

(21) Appl. No.: 15/122,459

(22) PCT Filed: Nov. 11, 2014

(86) PCT No.: PCT/CN2014/090847
§ 371 (c)(1),
(2) Date: Aug. 30, 2016

(87) PCT Pub. No.: WO2016/074160
PCT Pub. Date: May 19, 2016

(65) Prior Publication Data
US 2017/0237273 A1    Aug. 17, 2017

(51) Int. Cl.
*H02J 7/00*    (2006.01)
*G06F 1/20*    (2006.01)
*G06F 1/26*    (2006.01)

(52) U.S. Cl.
CPC ............ *H02J 7/0044* (2013.01); *G06F 1/206* (2013.01); *G06F 1/26* (2013.01); *H02J 7/007* (2013.01); *H02J 2007/0096* (2013.01)

(58) Field of Classification Search
CPC .. H02J 7/0044; H02J 7/007; H02J 2007/0096; G06F 1/26; G06F 1/206
(Continued)

(56) References Cited

U.S. PATENT DOCUMENTS

2007/0194626 A1    8/2007    Eager et al.
2014/0300321 A1    10/2014    Kim et al.
(Continued)

FOREIGN PATENT DOCUMENTS

CN    101399386 A    4/2009
CN    102957193 A    3/2013
(Continued)

OTHER PUBLICATIONS

Extended European Search Report issued in corresponding European application No. 14905845.5 dated Mar. 6, 2018.

*Primary Examiner* — Sun Lin
(74) *Attorney, Agent, or Firm* — Young Basile Hanlon & MacFarlane, P.C.

(57) ABSTRACT

The present disclosure provides a communication method, a power adaptor, and a terminal. The method includes: receiving, by a terminal, handshake information from a power adaptor before the terminal receives a charging current or a charging voltage from the power adaptor; determining, by the terminal, an initial charging parameter according to the handshake information; and sending, by the terminal, the initial charging parameter to the power adaptor to instruct the power adaptor to charge the terminal according to the initial charging parameter. In the embodiments of the present disclosure, before the power adaptor charges the terminal, the terminal receives the handshake information from the power adaptor, and determines the initial charging parameter according to the handshake information.

30 Claims, 4 Drawing Sheets

(58) Field of Classification Search
USPC .......................................................... 320/114
See application file for complete search history.

(56) References Cited

U.S. PATENT DOCUMENTS

| | | | |
|---|---|---|---|
| 2017/0237273 A1* | 8/2017 | Zhang | H02J 7/0044 320/114 |
| 2017/0244265 A1* | 8/2017 | Zhang | H02J 7/0044 |
| 2017/0279286 A1* | 9/2017 | Zhang | H02J 7/0045 |

FOREIGN PATENT DOCUMENTS

| | | |
|---|---|---|
| CN | 103730933 A | 4/2014 |
| CN | 103762702 A | 4/2014 |
| CN | 104065126 A | 9/2014 |
| CN | 104065147 A | 9/2014 |
| CN | 104124483 A | 10/2014 |
| EP | 3101766 A1 | 12/2016 |
| WO | 2014077978 A1 | 5/2014 |

* cited by examiner

COMMUNICATION METHOD, POWER ADAPTER AND TERMINAL

CROSS REFERENCE TO RELATED APPLICATIONS

This present application is a United States National Stage Application of International Patent Application No. PCT/CN2014/090847, filed on Nov. 11, 2014 and entitled "COMMUNICATION METHOD, POWER ADAPTOR AND TERMINAL", the entire contents of which is hereby incorporated by reference in its entirety.

TECHNICAL FIELD

The present disclosure relates to charging field, and more particularly to a communication method, a power adaptor, and a terminal.

BACKGROUND

Presently, smart phones become more and more popular with consumers. However, the power consumption of smart phones is great, thus smart phones need to be charged regularly. As the battery capacity of smart phones becomes greater and greater, correspondingly, the charging time becomes longer. How to realize quick charging is a problem that needed to be solved instantly.

In the present technology, to realize the purpose of quick charging, the output current or output voltage of a power adaptor is directly increased without consideration of endurance of a smart phone, which results in a phenomenon of the heating and even burnout of the smart phone, and reduces the lifespan of the smart phone.

SUMMARY

The embodiments of the present disclosure provide a communication method, a power adaptor, and a terminal, which can avoid a phenomenon of the heating of a smart phone due to the fact that the output current or output voltage of the power adaptor is blindly increased.

A first aspect provides a communication method which includes: receiving, by a terminal, handshake information from a power adaptor before the terminal receives a charging current from the power adaptor; determining, by the terminal, an initial charging parameter according to the handshake information; and sending, by the terminal, the initial charging parameter to the power adaptor to instruct the power adaptor to charge the terminal according to the initial charging parameter.

In combination with the first aspect, in an implementation manner of the first aspect, the step of receiving the handshake information from the power adaptor comprises: sending, by the terminal, a handshake requesting message to the power adaptor; and receiving, by the terminal, a handshake response message from the power adaptor, wherein the handshake response message comprises the handshake information.

In combination with the first aspect or any of the above implementation manners, in another implementation manner of the first aspect, the step of receiving the handshake information from the power adaptor comprises: sending, by the terminal, a first handshake requesting message to the power adaptor; and receiving, by the terminal, a first handshake response message from the power adaptor, wherein the first handshake response message comprises first information of the handshake information, and the first information indicates that the power adaptor supports a quick charging mode. The step of determining the initial charging parameter according to the handshake information by the terminal comprises: determining, by the terminal, that a charging mode of the initial charging parameter is the quick charging mode according to the first information of the handshake information.

In combination with the first aspect or any of the above implementation manners, in another implementation manner of the first aspect, the step of receiving the handshake information from the power adaptor further comprises: sending, by the terminal, second handshake information to the power adaptor; and receiving, by the terminal, a second handshake response message from the power adaptor, wherein the second handshake response message comprises second information of the handshake information, and the second information indicates a model or an identification of the power adaptor. The step of determining the initial charging parameter according to the handshake information by the terminal further comprises: determining, by the terminal, a charging voltage and/or charging current of the initial charging parameter according to the second information of the handshake information.

In combination with the first aspect or any of the above implementation manners, in another implementation manner of the first aspect, the handshake information comprises at least one of following information: model of the power adaptor, identification of the power adaptor, work status of the power adaptor, maximum output voltage supported by the power adaptor, maximum output current support by the power adaptor, and charging mode supported by the power adaptor.

In combination with the first aspect or any of the above implementation manners, in another implementation manner of the first aspect, the initial charging parameter comprises at least one of following parameters: charging mode, charging voltage, and charging current, wherein the charging mode comprises quick charging mode and normal charging mode.

In combination with the first aspect or any of the above implementation manners, in another implementation manner of the first aspect, the step of determining the initial charging parameter according to the handshake information by the terminal comprises: determining, by the terminal, a charging parameter to be negotiated according to the handshake information; sending, by the terminal, a negotiation requesting message to the power adaptor, wherein the negotiation requesting message comprises the charging parameter to be negotiated; receiving, by the terminal, a negotiation response message determined based on the charging parameter to be negotiated from the power adaptor; and determining, by the terminal, the initial charging parameter according to the negotiation response message.

In combination with the first aspect or any of the above implementation manners, in another implementation manner of the first aspect, the step of determining the initial charging parameter according to the negotiation response message by the terminal comprises: determining, by the terminal, the charging parameter to be negotiated as the initial charging parameter when the negotiation response message indicates that the power adaptor has confirmed the charging parameter to be negotiated; adjusting, by the terminal, the charging parameter to be negotiated according to an adjustment parameter of the negotiation response message when the negotiation response message indicates that the power adaptor has denied the charging parameter to be negotiated, and determining, by the terminal, the adjusted charging parameter to be negotiated as the initial charging parameter.

A second aspect provides a communication method which includes: sending, by a power adaptor, handshake information to a terminal before the power adaptor charges the terminal; receiving, by the power adaptor, an initial charging parameter from the terminal, wherein the initial charging parameter is determined based on the handshake information by the terminal; and charging, by the power adaptor, the terminal according to the initial charging parameter.

In combination with the second aspect, in an implementation manner of the second aspect, the step of sending the handshake information to the terminal comprises: receiving, by the power adaptor, a handshake requesting information from the terminal; and sending, by the power adaptor, a handshake response message to the terminal, wherein the handshake response message comprises the handshake information.

In combination with the second aspect or any of the above implementation manners, in another implementation manner of the second aspect, the step of sending the handshake information to the terminal comprises: receiving, by the power adaptor, a first handshake requesting message from the terminal; and sending, by the power adaptor, a first handshake response message to the terminal, wherein the first handshake response message comprises first information of the handshake information, and the first information indicates that the power adaptor supports a quick charging mode.

In combination with the second aspect or any of the above implementation manners, in another implementation manner of the second aspect, the step of sending the handshake information to the terminal further comprises: receiving, by the power adaptor, a second handshake requesting message from the terminal; and sending, by the power adaptor, a second handshake response message to the terminal, wherein the second handshake response message comprises second information of the handshake information, and the second information indicates a model or an identification of the power adaptor.

In combination with the second aspect or any of the above implementation manners, in another implementation manner of the second aspect, the handshake information comprises at least one of following information: model of the power adaptor, identification of the power adaptor, work status of the power adaptor, maximum output voltage supported by the power adaptor, maximum output current support by the power adaptor, and charging mode supported by the power adaptor.

In combination with the second aspect or any of the above implementation manners, in another implementation manner of the second aspect, the initial charging parameter comprises at least one of following parameters: charging mode, charging voltage, and charging current, wherein charging mode comprises quick charging mode and normal charging mode.

In combination with the second aspect or any of the above implementation manners, in another implementation manner of the second aspect, before the power adaptor receives the initial charging parameter from the terminal, the method further comprises: receiving, by the power adaptor, a negotiation requesting message from the terminal, wherein the negotiation requesting message comprises the charging parameter to be negotiated, and the charging parameter to be negotiated is determined based on the handshake information by the terminal; determining, by the power adaptor, whether or not the power adaptor is able to charge the terminal according to the charging parameter to be negotiated and work parameters of the power adaptor; sending, by the power adaptor, a negotiation response message to the terminal when the power adaptor is able to charge the terminal according to the charging parameter to be negotiated, wherein the negotiation response message indicates that the terminal determines the charging parameter to be negotiated as the initial charging parameter; and sending, by the power adaptor, a negotiation response message to the terminal when the power adaptor is not able to charge the terminal according to the charging parameter to be negotiated, wherein the negotiation response message comprises an adjustable parameter and instructs the terminal to adjust the initial charging parameter according to the adjustable parameter.

A third aspect provides a terminal which includes: a first transceiving unit configured to receive handshake information from a power adaptor before the terminal receives a charging current from the power adaptor; a determining unit configured to determine an initial charging parameter according to the handshake information; and a second transceiving unit configured to send the initial charging parameter to the power adaptor to instruct the power adaptor to charge the terminal according to the initial charging parameter.

In combination with the third aspect, in an implementation manner of the third aspect, the first transceiving unit is specifically configured to send a handshake requesting message to the power adaptor, and receive a handshake response message from the power adaptor, wherein the handshake response message comprises the handshake information.

In combination with the third aspect or any of the above implementation manners, in another implementation manner of the third aspect, the first transceiving unit is specifically configured to send a first handshake requesting message to the power adaptor, and receive a first handshake response message from the power adaptor, wherein the first handshake response message comprises first information of the handshake information, and the first information indicates that the power adaptor supports a quick charging mode. The determining unit is specifically configured to determine that a charging mode of the initial charging parameter is the quick charging mode according to the first information of the handshake information.

In combination with the third aspect or any of the above implementation manners, in another implementation manner of the third aspect, the first transceiving unit is further configured to send second handshake information to the power adaptor, and receive a second handshake response message from the power adaptor, wherein the second handshake response message comprises second information of the handshake information, and the second information indicates a model or an identification of the power adaptor. The determining unit is specifically configured to determine a charging voltage and/or a charging current of the initial charging parameter according to the second information of the handshake information.

In combination with the third aspect or any of the above implementation manners, in another implementation manner of the third aspect, the handshake information comprises at least one of following information: model of the power adaptor, identification of the power adaptor, work status of the power adaptor, maximum output voltage supported by the power adaptor, maximum output current support by the power adaptor, and charging mode supported by the power adaptor.

In combination with the third aspect or any of the above implementation manners, in another implementation manner of the third aspect, the initial charging parameter comprises at least one of following parameters: charging mode, charging voltage, and charging current, wherein the charging mode comprises quick charging mode and normal charging mode.

In combination with the third aspect or any of the above implementation manners, in another implementation manner of the third aspect, the determining unit is specifically configured to determine a charging parameter to be negotiated according to the handshake information, and send a negotiation requesting message to the power adaptor, wherein the negotiation requesting message comprises the charging parameter to be negotiated. The determining unit is further configured to receive a negotiation response message determined based on the charging parameter to be negotiated from the power adaptor, and determine the initial charging parameter according to the negotiation response message.

In combination with the third aspect or any of the above implementation manners, in another implementation manner of the third aspect, the determining unit is specifically configured to determine the charging parameter to be negotiated as the initial charging parameter when the negotiation response message indicates that the power adaptor has confirmed the charging parameter to be negotiated, adjust the charging parameter to be negotiated according to an adjustment parameter of the negotiation response message when the negotiation response message indicates that the power adaptor has denied the charging parameter to be negotiated, and determine the adjusted charging parameter to be negotiated as the initial charging parameter.

A fourth aspect provides a power adaptor which includes: a first transceiving unit configured to send handshake information to a terminal before the power adaptor charges the terminal; a second transceiving unit configured to receive an initial charging parameter from the terminal, wherein the initial charging parameter is determined based on the handshake information by the terminal; and a charging unit configured to charge the terminal according to the initial charging parameter.

In combination with the fourth aspect, in an implementation manner of the fourth aspect, the first transceiving unit is specifically configured to receive a handshake requesting message from the terminal, and send a handshake response message to the terminal, wherein the handshake response message comprises the handshake information.

In combination with the fourth aspect or any of the above implementation manners, in another implementation manner of the fourth aspect, the first transceiving unit is specifically configured to receive a first handshake requesting message from the terminal, and send a first handshake response message to the terminal, wherein the first handshake response message comprises first information of the handshake information, and the first information indicates that the power adaptor supports a quick charging mode.

In combination with the fourth aspect or any of the above implementation manners, in another implementation manner of the fourth aspect, the first transceiving unit is further configured to receive a second handshake requesting message from the terminal, and send a second handshake response message to the terminal, wherein the second handshake response message comprises second information of the handshake information, and the second information indicates a model or an identification of the power adaptor.

In combination with the fourth aspect or any of the above implementation manners, in another implementation manner of the fourth aspect, the handshake information comprises at least one of following information: model of the power adaptor, identification of the power adaptor, work status of the power adaptor, maximum output voltage supported by the power adaptor, maximum output current support by the power adaptor, and charging mode supported by the power adaptor.

In combination with the fourth aspect or any of the above implementation manners, in another implementation manner of the fourth aspect, the initial charging parameter comprises at least one of following parameters: charging mode, charging voltage, and charging current, wherein the charging mode comprises quick charging mode and normal charging mode.

In combination with the fourth aspect or any of the above implementation manners, in another implementation manner of the fourth aspect, the power adaptor further comprises a negotiation unit configured to receive a negotiation requesting message from the terminal, wherein the negotiation requesting message comprises the charging parameter to be negotiated, and the charging parameter to be negotiated is determined based on the handshake information by the terminal. The negotiation unit is further configured to determine whether or not the power adaptor is able to charge the terminal according to the charging parameter to be negotiated and work parameters of the power adaptor, send a negotiation response message when the power adaptor is able to charge the terminal according to the charging parameter to be negotiated, wherein the negotiation response message indicates that the terminal determines the charging parameter to be negotiated as the initial charging parameter. The negotiation unit is further configured to send a negotiation response message to the terminal when the power adaptor is not able to charge the terminal according to the charging parameter to be negotiated, wherein the negotiation response message comprises an adjustable parameter and instructs the terminal to adjust the initial charging parameter according to the adjustable parameter.

In the embodiments of the present disclosure, before the power adaptor charges the terminal, the terminal receives the handshake information from the power adaptor, and determines the initial charging parameter according to the handshake information, which can avoid a phenomenon of the heating and even burnout of a mobile phone due to the fact that the voltage or current of the power adaptor is increased.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Those skilled in the art can obtain other accompanying drawings according to the described accompanying drawings without creative work.

DETAILED DESCRIPTION

The technical solution of embodiments of the present disclosure will be described clearly and completely in combination with the accompanying drawings of the embodiments of the present disclosure. Obviously, the described embodiments are a part of embodiments of the present disclosure, and not all of the embodiments. According to the embodiments of the present disclosure, other embodiments obtained by those skilled in the art without creative work all fall within the protection scope of the present disclosure.

Figure 1:
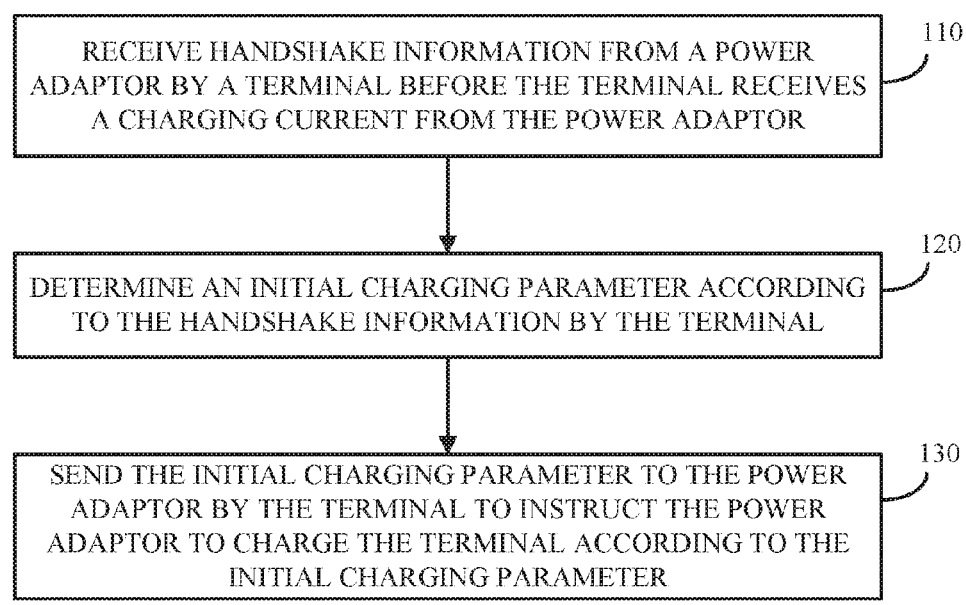
FIG. 1 is a schematic flow chart of a communication method in accordance with an exemplary embodiment of the present disclosure.

FIG. 1 is a schematic flow chart of a communication method in accordance with an exemplary embodiment of the present disclosure. In can be understood that the communication method is applied in a specific negotiation process of an initial charging parameter before a power adaptor charges a terminal. The method of FIG. 1 includes the following.

110, handshake information from the power adaptor is received by the terminal before the terminal receives a charging current from the power adaptor.

It can be understood that the power adaptor can send the handshake information to the terminal actively or passively. For example, the terminal firstly sends a handshake requesting message to the power adaptor, and when the power adaptor receives the handshake requesting message, the power adaptor returns a handshake response message to the terminal, and the handshake response message carries the handshake information. For another example, the power adaptor actively sends a handshake requesting message to the terminal, and the handshake requesting message carries the handshake information.

The handshake information can include at least one of following information: model of the power adaptor, identification of the power adaptor, work status of the power adaptor, maximum output voltage supported by the power adaptor, maximum output current supported by the power adaptor, and charging mode supported by the power adaptor.

It can be understood that before charging, one or more handshakes can occur between the terminal and the power adaptor until an initial charging parameter is determined.

120, an initial charging parameter is determined by the terminal according to the handshake information.

It can be understood that the initial charging parameter includes needed parameter when the power adaptor begins to charge the terminal. For example, the initial charging parameter can include at least one of the following parameters: the charging mode, the charging voltage, and the charging current, wherein the charging mode includes a quick charging mode and a normal charging mode.

What needed to be pointed out is that actually the terminal can firstly negotiate with the power adaptor to determine to adopt the quick charging mode or the normal charging mode to charge. Then the terminal negotiates with the power adaptor to determine the charging voltage or current. Or, the terminal negotiates with the power adaptor to only determine the charging mode. Or, the terminal negotiates with the power adaptor to only determine the charging voltage or the charging current.

130, the initial charging parameter is sent by the terminal to the power adaptor to instruct the power adaptor to charge the terminal according to the initial charging parameter.

In an embodiment of the present disclosure, before the power adaptor charges the terminal, the terminal receives the handshake information from the power adaptor, and determines the initial charging parameter according to the handshake information, which can avoid a phenomenon of the heating and even burnout of a mobile phone due to the fact that the voltage or current of the power adaptor is increased.

Optionally, in an embodiment, step 110 can include: sending, by the terminal, the handshake requesting message to the power adaptor; receiving, by the terminal, the handshake response message from the power adaptor, wherein the handshake response message includes the handshake information. That is, the terminal actively sends the handshake requesting message to the power adaptor. Actually, no matter whether or not the power adaptor is coupled to the terminal, the terminal can continuously send the handshake requesting message to outside via a charging interface. After receiving the handshake response message from the power adaptor, the subsequent negotiation process of the initial charging parameter can be executed.

Optionally, step 110 can include: receiving, by the terminal, the handshake requesting message from the power adaptor, wherein the handshake requesting message includes the handshake information. That is, the power adaptor actively sends the handshake requesting message to the terminal. Actually, no matter whether or not the power adaptor is coupled to the terminal, the power adaptor can continuously send the handshake requesting message to outside via a charging interface. After receiving the handshake response message from the terminal, the subsequent negotiation process of the initial charging parameter can be executed.

Optionally, in an embodiment, step 110 can include: sending, by the terminal, a first handshake requesting message to the power adaptor; receiving, by the terminal, a first handshake response message from the power adaptor, wherein the first handshake response message includes first information of the handshake information, and the first information indicates that the power adaptor supports the quick charging mode. Step 120 can include determining that the charging mode of the initial charging parameter is the quick charging mode by the terminal according to the first information of the handshake information.

That is, the power adaptor negotiates with the terminal via a handshake to determine to adopt the quick charging mode or the normal charging mode to charge the terminal. It can be understood that the first handshake requesting message may carry nothing, or, the first handshake requesting message can indicate that the terminal supports the quick charging mode.

Furthermore, step 110 can further include: sending, by the terminal, second handshake information to the power adaptor; receiving, by the terminal, a second handshake response message from the power adaptor, wherein the second handshake response message includes second information of the handshake information, and the second information indicates the model or identification of the power adaptor. Step 120 can further include determining the charging voltage and/or charging current of the initial charging parameter by the terminal according to the second information of the handshake information.

That is, after the charging mode has been determined via negotiation between the power adaptor and the terminal, the charging voltage or the charging current needs to be determined. For example, if the model of the power adaptor matches with that of the terminal, after the terminal determines the model of the power adaptor, the terminal can directly determine the charging voltage or the charging current which can be output by the power adaptor.

Optionally, in an embodiment, step 120 can include: determining, by the terminal, a charging parameter to be negotiated according to the handshake information; sending, by the terminal, a negotiation requesting message to the power adaptor, wherein the negotiation requesting message includes the charging parameter to be negotiated; receiving, by the terminal, a negotiation response message determined according to the charging parameter to be negotiated from the power adaptor; determining, by the terminal, the initial charging parameter according to the negotiation response message.

Furthermore, determining the initial charging parameter according to the negotiation response message by the terminal includes: determining, by the terminal, the charging parameter to be negotiated as the initial charging parameter when the negotiation response message indicates that the power adaptor has confirmed the charging parameter to be negotiated; adjusting, by the terminal, the charging parameter to be negotiated according to an adjustment parameter of the negotiation response message when the negotiation response message indicates that the power adaptor has denied the charging parameter to be negotiated, and determining the adjusted charging parameter to be negotiated as the initial charging parameter.

Specifically, after the terminal obtains the handshake information, rather than the terminal determines the final initial charging parameter by itself, the terminal firstly determines the charging parameter to be negotiated, and then queries the power adaptor whether or not the charging parameter to be negotiated is proper via the negotiation requesting message. If the power adaptor agrees, the terminal determines the charging parameter to be negotiated as the initial charging parameter, and if the power adaptor disagrees, the terminal redetermines the charging parameter to be determined, or modifies the charging parameter to be negotiated according to an instruction from the power adaptor. What needed to be pointed out is that the power adaptor can determine whether or not the charging parameter to be negotiated is proper according to its work parameters, for example, battery temperature, battery capacity, current work status, and so on, and the embodiments of the present disclosure are not limited to specific work parameters.

The above specifically describes the communication method of the embodiments of the present disclosure executed by the terminal in combination with FIG. 1. The following will specifically describes the communication method of the embodiments of the present disclosure executed by the power adaptor in combination with FIG. 2. It can be understood that the power adaptor and the terminal are two devices which interact with each other in the charging negotiation process, and interaction information and processes are the same or similar. For simplicity, repeated description will be omitted appropriately.

Figure 2:
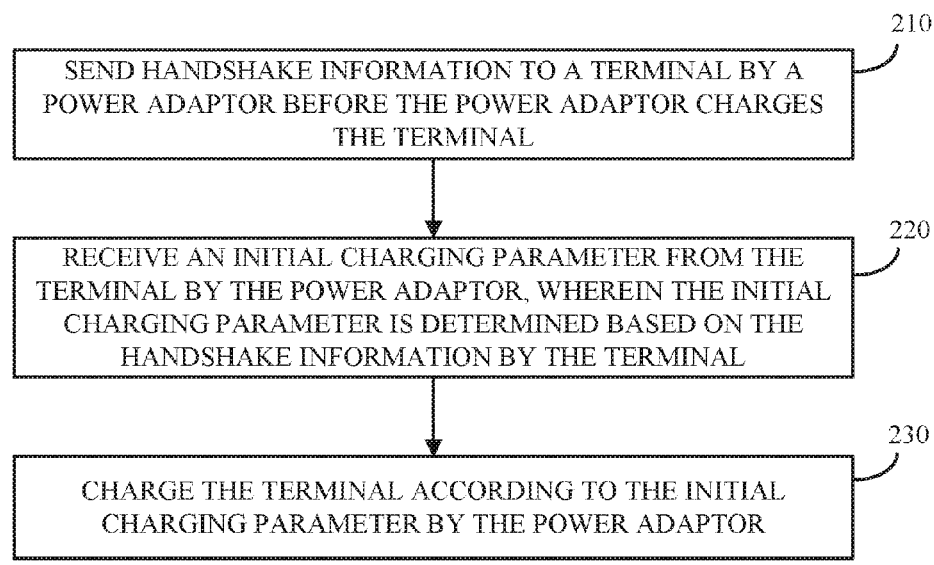
FIG. 2 is a schematic flow chart of a communication method in accordance with an exemplary embodiment of the present disclosure.

FIG. 2 is a schematic flow chart of a communication method in accordance with an exemplary embodiment of the present disclosure. It can be understood that the method of FIG. 2 includes the following.

210, handshake information is sent by the power adaptor to the terminal before the power adaptor charges the terminal.

220, an initial charging parameter is received by the power adaptor from the terminal, wherein the initial charging parameter is determined based on the handshake information by the terminal.

230, the terminal is charged by the power adaptor according to the initial charging parameter.

In the embodiment of the present disclosure, before the power adaptor charges the terminal, the terminal receives the handshake information from the power adaptor, and determines the initial charging parameter according to the handshake information, which can avoid a phenomenon of the heating and even burnout of a mobile phone due to the fact that the voltage or current of the power adaptor is increased.

Optionally, in an embodiment, sending the handshake information to the terminal includes: receiving, by the power adaptor, a handshake requesting message from the power adaptor; sending, by the power adaptor, a handshake response message to the terminal, wherein the handshake response message includes the handshake information.

Optionally, in an embodiment, step 210 may include: receiving, by the power adaptor, a first handshake requesting message from the terminal; sending, by the power adaptor, a first handshake response message to the terminal, wherein the first handshake response message includes first information of the handshake information, and the first information indicates that the power adaptor supports the quick charging mode.

Optionally, in an embodiment, step 210 may further include: receiving, by the power adaptor, a second handshake requesting message from the terminal; sending, by the power adaptor, a second handshake response message to the terminal, wherein the second handshake response message includes second information of the handshake information, and the second information indicates the model or identification of the power adaptor.

Optionally, in an embodiment, the handshake information includes at least one of following information: model of the power adaptor, identification of the power adaptor, work status of the power adaptor, maximum output voltage supported by the power adaptor, maximum output current supported by the power adaptor, and charging mode supported by the power adaptor.

Optionally, in an embodiment, the initial charging parameter includes at least one of following parameters: charging mode, charging voltage, and charging current. Wherein, the charging mode includes a quick charging mode and a normal charging mode.

Optionally, in an embodiment, before the power adaptor receives the initial charging parameter from the terminal, the method of FIG. 2 can further include: receiving, by the power adaptor, a negotiation requesting message from the terminal, wherein the negotiation requesting message includes a charging parameter to be negotiated, and the charging parameter to be negotiated is determined by the terminal based on the handshake information; determining, by the power adaptor, whether the power adaptor can charge the terminal according to the charging parameter to be negotiated and work parameters of the power adaptor; sending, by the power adaptor, a negotiation response message to the terminal when it is determined that the power adaptor can charge the terminal according to the charging parameter to be negotiated, wherein the negotiation response message instructs the terminal to determine the charging parameter to be negotiated as the initial charging parameter;

sending, by the power adaptor, a negotiation response message to the terminal when it is determined that the power adaptor cannot charge the terminal according to the charging parameter to be negotiated, wherein the negotiation response message includes an adjustment parameter and instructs the terminal to determine the initial charging parameter according to the adjustment parameter.

Figure 3:
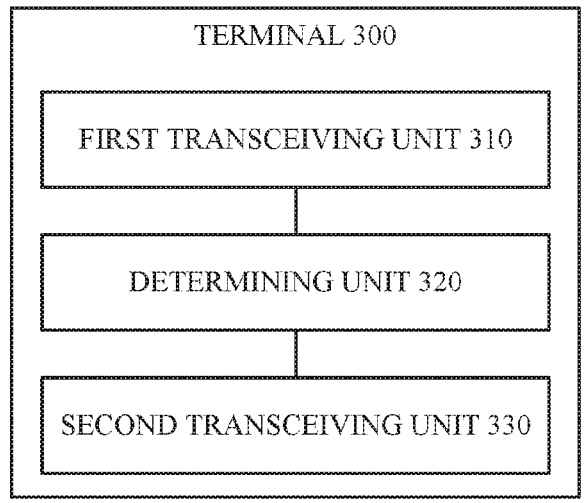
FIG. 3 is a schematic block diagram of a terminal in accordance with an exemplary embodiment of the present disclosure.
Figure 6:
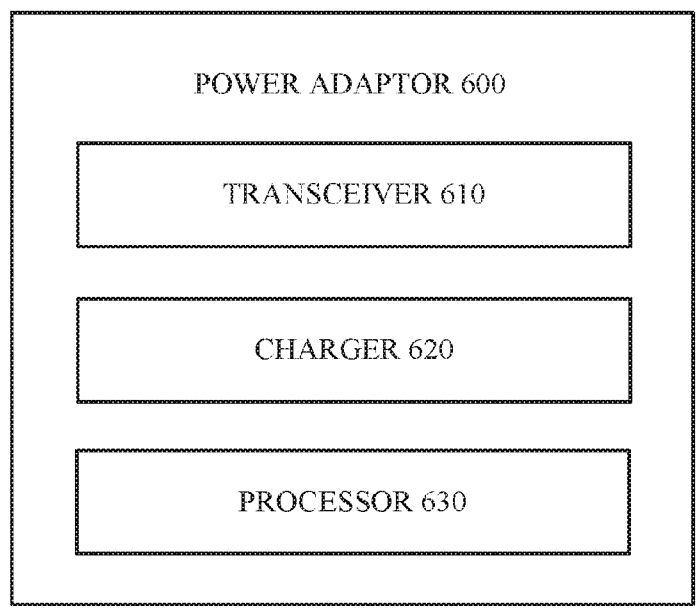
FIG. 6 is a schematic block diagram of a power adaptor in accordance with an exemplary embodiment of the present disclosure.

The above specifically describes the communication method of the embodiments of the present disclosure in combination with FIG. 1 and FIG. 2, and the following will specifically describe the terminal and the power adaptor of the embodiments of the present disclosure in combination with FIGS. 3 and 6.

FIG. 3 is a schematic block diagram of a terminal in accordance with an embodiment of the present disclosure. It can be understood that a terminal 300 of FIG. 3 can realize various steps executed by a terminal described in FIG. 1 and FIG. 2. To avoid repetition, herein detailed description will not appear. The terminal 300 of FIG. 3 includes the following.

A first transceiving unit 310 is configured to receive handshake information from the power adaptor before the terminal 300 receives a charging current from the power adaptor.

A determining unit 320 is configured to determine an initial charging parameter according to the handshake information received by the first transceiving unit 310.

A second transceiving unit 330 is configured to send the initial charging parameter determined by the determining unit 320 to the power adaptor and instruct the power adaptor to charge the terminal according to the initial charging parameter.

In the embodiment of the present disclosure, before the power adaptor charges the terminal, the terminal receives the handshake information from the power adaptor, and determines the initial charging parameter according to the handshake information, which can avoid a phenomenon of the heating and even burnout of a mobile phone due to the fact that the voltage or current of the power adaptor is increased.

Optionally, in an embodiment, specifically, the first transceiving unit 310 is configured to send a handshake requesting message to the power adaptor, and receive a handshake response message from the power adaptor, wherein the handshake response message includes the handshake information.

Optionally, in an embodiment, specifically, the first transceiving unit 310 is configured to send a first handshake requesting message to the power adaptor, and receive a first handshake response message from the power adaptor, wherein the first handshake response message includes first information of the handshake information, and the first information indicates that the power adaptor supports the quick charging mode. Specifically, the determining unit 320 is configured to determine that the charging mode of the initial charging parameter is the quick charging mode according to the first information of the handshake information.

Optionally, in an embodiment, the first transceiving unit 310 further sends second handshake information to the power adaptor, and receives a second handshake response message from the power adaptor, wherein the second handshake response message includes second information of the handshake information, and the second information indicates the model or identification of the power adaptor. Specifically, the determining unit 320 is configured to determine the charging voltage and/or charging current of the initial charging parameter according to the second information of the handshake information.

Optionally, in an embodiment, the handshake information includes at least one of following information: model of the power adaptor, identification of the power adaptor, work status of the power adaptor, maximum output voltage supported by the power adaptor, maximum output current supported by the power adaptor, and charging mode supported by the power adaptor.

Optionally, in an embodiment, the initial charging parameter includes at least one of following parameters: charging mode, charging voltage, and charging current, wherein the charging mode includes a quick charging mode and a normal charging mode.

Optionally, in an embodiment, specifically, the determining unit 320 is configured to determine a charging parameter to be negotiated according to the handshake information, and send a negotiation requesting message to the power adaptor, wherein the negotiation requesting message includes the charging parameter to be negotiated. The determining unit 320 is further configured to receive a negotiation response message determined according to the charging parameter to be negotiated from the power adaptor, and determine the initial charging parameter according to the negotiation response message.

Optionally, in an embodiment, specifically, the determining unit 320 is configured to determine the charging parameter to be negotiated as the initial charging parameter when the negotiation response message indicates that the power adaptor has confirmed the charging parameter to be negotiated, and adjust the charging parameter to be negotiated according to an adjustment parameter of the negotiation response message when the negotiation response message indicates that the power adaptor has denied the charging parameter to be negotiated, and determine the adjusted charging parameter to be negotiated as the initial charging parameter.

Figure 4:
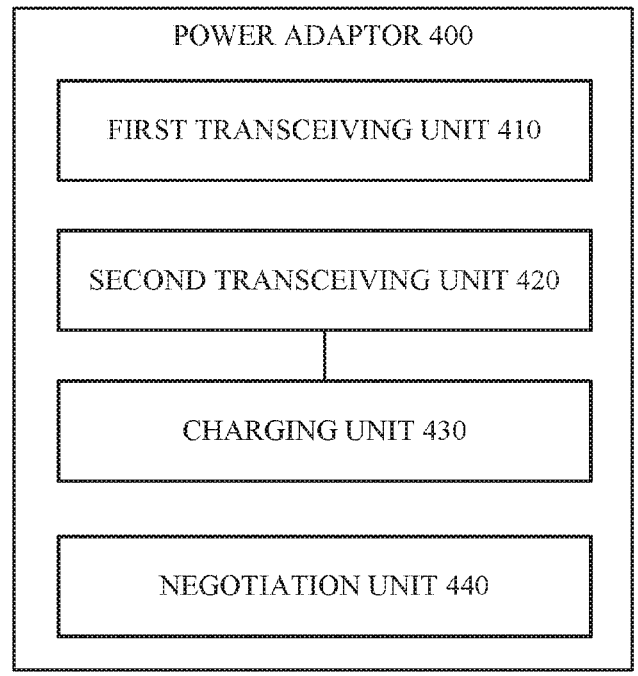
FIG. 4 is a schematic block diagram of a power adaptor in accordance with an exemplary embodiment of the present disclosure.

FIG. 4 is a schematic block diagram of a power adaptor in accordance with an exemplary embodiment of the present disclosure. It can be understood that a power adaptor 400 of FIG. 4 can realize various steps executed by a power adaptor described in FIG. 1 and FIG. 2. To avoid repetition, herein detailed description will not appear. The power adaptor includes the following.

A first transceiving unit 410 is configured to send handshake information to a terminal before the power adaptor charges the terminal.

A second transceiving unit 420 is configured to receive an initial charging parameter from the terminal. Wherein, the initial charging parameter is determined based on the handshake information by the terminal.

A charging unit 430 is configured to charge the terminal according to the initial charging parameter.

In the embodiment of the present disclosure, before the power adaptor charges the terminal, the terminal receives the handshake information from the power adaptor, and determines the initial charging parameter according to the handshake information, which can avoid a phenomenon of the heating and even burnout of a mobile phone due to the fact that the voltage or current of the power adaptor is increased.

Optionally, in an embodiment, specifically, the first transceiving unit 410 is configured to receive a handshake requesting message from the power adaptor, and send a handshake response message to the terminal, wherein the handshake response message includes the handshake information.

Optionally, in an embodiment, specifically, the first transceiving unit 410 is configured to receive a first handshake requesting message from the terminal, and send a first handshake response message to the terminal, wherein the first handshake response message includes first information of the handshake information, and the first information indicates that the power adaptor supports the quick charging mode.

Optionally, in an embodiment, the first transceiving unit 410 is further configured to receive a second handshake requesting message from the terminal, and sends a second handshake response message to the terminal, wherein the second handshake response message includes second information of the handshake information, and the second information indicates the model or identification of the power adaptor.

Optionally, in an embodiment, the handshake information includes at least one of following information: model of the power adaptor, identification of the power adaptor, work status of the power adaptor, maximum output voltage supported by the power adaptor, maximum output current supported by the power adaptor, and charging mode supported by the power adaptor.

Optionally, in an embodiment, the initial charging parameter includes at least one of following parameters: charging mode, charging voltage, and charging current. Wherein, the charging mode includes a quick charging mode and a normal charging mode.

Optionally, in an embodiment, the power adaptor 400 can further include a negotiation unit 440 configured to receive a negotiation requesting message from the terminal, wherein the negotiation requesting message includes a charging parameter to be negotiated, and the charging parameter to be negotiated is determined based on the handshake information by the terminal. The negotiation unit 440 is further configured to determine whether or not the power adaptor can charge the terminal according to the charging parameter to be negotiated and work parameters of the power adaptor, and send a negotiation response message to the terminal when it is determined that the power adaptor can charge the terminal according to the charging parameter to be negotiated, wherein the negotiation response message instructs the terminal to determine the charging parameter to be negotiated as the initial charging parameter. The negotiation unit 440 is further configured to send a negotiation response message to the terminal when it is determined that the power adaptor cannot charge the terminal according to the charging parameter to be negotiated, wherein the negotiation response message includes an adjustment parameter and instructs the terminal to determine the initial charging parameter according to the adjustment parameter.

Figure 5:
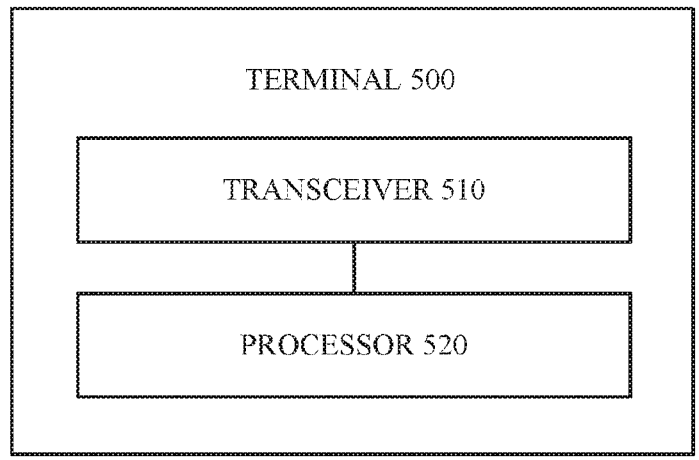
FIG. 5 is a schematic block diagram of a terminal in accordance with an exemplary embodiment of the present disclosure.

FIG. 5 is a schematic block diagram of a terminal in accordance with an exemplary embodiment of the present disclosure. It can be understood that a terminal 500 of FIG. 5 can realize various steps executed by a terminal described in FIG. 1 and FIG. 2. To avoid repetition, herein detailed description will not appear. The terminal 500 of FIG. 5 includes the following.

A transceiver 510 is configured to receive handshake information from the power adaptor before the terminal 500 receives a charging current from the power adaptor.

A processor 520 is configured to determine an initial charging parameter according to the handshake information received by the transceiver 510.

The transceiver 510 is further configured to send the initial charging parameter determined by the processor 520 to the power adaptor and instruct the power adaptor to charge the terminal according to the initial charging parameter.

In the embodiment of the present disclosure, before the power adaptor charges the terminal, the terminal receives the handshake information from the power adaptor, and determines the initial charging parameter according to the handshake information, which can avoid a phenomenon of the heating and even burnout of a mobile phone due to the fact that the voltage or current of the power adaptor is increased.

Optionally, in an embodiment, specifically, the transceiver 510 is configured to send a handshake requesting message to the power adaptor, and receive a handshake response message from the power adaptor, wherein the handshake response message includes the handshake information.

Optionally, in an embodiment, specifically, the transceiver 510 is configured to send a first handshake requesting message to the power adaptor, and receive a first handshake response message from the power adaptor, wherein the first handshake response message includes first information of the handshake information, and the first information indicates that the power adaptor supports the quick charging mode. Specifically, the processor 520 is configured to determine that the charging mode of the initial charging parameter is the quick charging mode according to the first information of the handshake information.

Optionally, in an embodiment, the transceiver 510 is further configured to send second handshake information to the power adaptor, and receive a second handshake response message from the power adaptor, wherein the second handshake response message includes second information of the handshake information, and the second information indicates the model or identification of the power adaptor. Specifically, the processor 520 is configured to determine the charging voltage and/or charging current of the initial charging parameter according to the second information of the handshake information.

Optionally, in an embodiment, the handshake information includes at least one of following information: model of the power adaptor, identification of the power adaptor, work status of the power adaptor, maximum output voltage supported by the power adaptor, maximum output current supported by the power adaptor, and charging mode supported by the power adaptor.

Optionally, in an embodiment, the initial charging parameter includes at least one of following parameters: charging mode, charging voltage, and charging current, wherein the charging mode includes a quick charging mode and a normal charging mode.

Optionally, in an embodiment, specifically, the processor 520 is configured to determine a charging parameter to be negotiated according to the handshake information, and send a negotiation requesting message to the power adaptor, wherein the negotiation requesting message includes the charging parameter to be negotiated. The processor 520 is further configured to receive a negotiation response message determined according to the charging parameter to be negotiated from the power adaptor, and determine the initial charging parameter according to the negotiation response message.

Optionally, in an embodiment, specifically, the processor 520 is configured to determine the charging parameter to be negotiated as the initial charging parameter when the negotiation response message indicates that the power adaptor has confirmed the charging parameter to be negotiated, and adjust the charging parameter to be negotiated according to an adjustment parameter of the negotiation response message when the negotiation response message indicates that the power adaptor has denied the charging parameter to be negotiated, and determine the adjusted charging parameter to be negotiated as the initial charging parameter.

FIG. 6 is a schematic block diagram of a power adaptor in accordance with an exemplary embodiment of the present disclosure. It can be understood that a power adaptor 600 of FIG. 6 can realize various steps executed by a power adaptor described in FIG. 1 and FIG. 2. To avoid repetition, herein detailed description will not appear. The power adaptor 600 includes the following.

The transceiver 610 is configured to send handshake information to a terminal before the power adaptor charges the terminal, and receive an initial charging parameter from the terminal. Wherein, the initial charging parameter is determined based on the handshake information by the terminal.

A charger 620 is configured to charge the terminal according to the initial charging parameter.

In the embodiment of the present disclosure, before the power adaptor charges the terminal, the terminal receives the handshake information from the power adaptor, and determines the initial charging parameter according to the handshake information, which can avoid a phenomenon of the heating and even burnout of a mobile phone due to the fact that the voltage or current of the power adaptor is increased.

Optionally, in an embodiment, specifically, the transceiver 610 is configured to receive a handshake requesting message from the power adaptor, and send a handshake response message to the terminal, wherein the handshake response message includes the handshake information.

Optionally, in an embodiment, specifically, the transceiver 610 is configured to receive a first handshake requesting message from the terminal, and send a first handshake response message to the terminal, wherein the first handshake response message includes first information of the handshake information, and the first information indicates that the power adaptor supports the quick charging mode.

Optionally, in an embodiment, the transceiver 610 is further configured to receive a second handshake requesting message from the terminal, and send a second handshake response message to the terminal, wherein the second handshake response message includes second information of the handshake information, and the second information indicates the model or identification of the power adaptor.

Optionally, in an embodiment, the handshake information includes at least one of following information: model of the power adaptor, identification of the power adaptor, work status of the power adaptor, maximum output voltage supported by the power adaptor, maximum output current supported by the power adaptor, and charging mode supported by the power adaptor.

Optionally, in an embodiment, the initial charging parameter includes at least one of following parameters: charging mode, charging voltage, and charging current. Wherein, the charging mode includes a quick charging mode and a normal charging mode.

Optionally, in an embodiment, the power adaptor 600 can further include a processor 630 configured to receive a negotiation requesting message from the terminal, wherein the negotiation requesting message includes a charging parameter to be negotiated, and the charging parameter to be negotiated is determined based on the handshake information by the terminal. The processor 630 is further configured to determine whether or not the power adaptor can charge the terminal according to the charging parameter to be negotiated and work parameters of the power adaptor, and send a negotiation response message to the terminal when it is determined that the power adaptor can charge the terminal according to the charging parameter to be negotiated, wherein the negotiation response message instructs the terminal to determine the charging parameter to be negotiated as the initial charging parameter. The processor 630 is further configured to send a negotiation response message to the terminal when it is determined that the power adaptor cannot charge the terminal according to the charging parameter to be negotiated, wherein the negotiation response message includes an adjustment parameter and instructs the terminal to determine the initial charging parameter according to the adjustment parameter.

It should be understood that in the present disclosure, the term "and/or" are only used to describe association relationship of association objects, and indicates that there can be three relationships. For example, A and/or B can indicate that there is only A, there are A and B, and there is only B. Additionally, in the present disclosure, the symbol of "/" generally indicates the relationship of "or" between association objects.

It should be understood that in various embodiments of the present disclosure, the sequence numbers of the above processes do not indicate an execution order. The execution order of the above processes is determined according to functions and interior logic relationship of the above processes, and should not limit implementation process of the embodiments of the present disclosure.

Those skilled in the art should appreciate that units and programming steps of various examples described in the embodiments of the present disclosure can be realized by electronic hardware or a combination of computer software and electronic hardware. Whether these functions are realized by hardware or software depends on particular applications and design constraint conditions. For each particular application, professionals can employ different methods to realize described functions, but this realization should fall into the scope of the present disclosure.

For convenience and simplicity, those skilled in the art can clearly understand that when the specific work processes of the above described systems, devices, and units are described, the corresponding processes of the above method embodiments can be referred, which will not be repeated herein.

In several embodiments provided by the present disclosure, it can be understood that the disclosed systems, devices, and methods can be implemented by other manners. For example, the device embodiments described above are only schematic. For example, the units are divided according to logic functions and can be divided by another manner in an actual implementation. For example, several units or assemblies can be combined or can be integrated into another system, or some features can be ignored, or are not executed. Another point is that mutual coupling or direct coupling or communication connection shown or discussed herein can be indirect coupling or communication connection through certain interfaces, devices, or units, and can be in the form of electricity, machine, or other.

The units illustrated as separate units can be or cannot be physically separated, and components shown in units can be or cannot be physical units, that is, can be in a place, or can be distributed in several network units. A part of or all of the units can be selected according to actual need to realize the purpose of the solution of the embodiments.

Additionally, various functional units in the embodiments of the present disclosure can be integrated into one processing unit, or various functional units can exist alone, or two or more units can be integrated into one unit.

If the functions can be realized in the form of software functional units and can be sold or used as stand-alone products, they can be stored in a computer-readable storage medium. Based on such understanding, the technical solution of the present disclosure or the part that contributes to the existing technology or a part of the technical solution can be embodied in the form of a software product. The computer software product can be stored in a storage medium, and include a plurality of instructions configured to direct a computer device (personal computer, server, or network device) to execute all of or a part of steps of various embodiments of the present disclosure. The storage mediums described above include a U disk, a mobile disk, a read-only memory (ROM), a random access memory (RAM), a disc, a compact disc, or other medium storing program codes.

The foregoing descriptions are merely preferred embodiments of the present disclosure, rather than limiting the present disclosure. Any one skilled in the art can easily make change or alterations within the technology range of the present disclosure, and those change or alterations shall fall within the protection scope of the present disclosure. Therefore, the protection scope of the present disclosure shall be limited by the protection scope of the claims.

What is claimed is:

1. A communication method comprising:
   receiving, by a terminal, handshake information from a power adaptor before the terminal receives a charging current from the power adaptor;
   determining, by the terminal, an initial charging parameter according to the handshake information; and
   sending, by the terminal, the initial charging parameter to the power adaptor to instruct the power adaptor to charge the terminal according to the initial charging parameter.

2. The method of claim 1, wherein the receiving handshake information from a power adaptor comprises:
   sending, by the terminal, a handshake requesting message to the power adaptor; and
   receiving, by the terminal, a handshake response message from the power adaptor, wherein the handshake response message comprises the handshake information.

3. The method of claim 1, wherein the receiving handshake information from a power adaptor comprises:
   sending, by the terminal, a first handshake requesting message to the power adaptor; and
   receiving, by the terminal, a first handshake response message from the power adaptor, wherein the first handshake response message comprises first information of the handshake information, and the first information indicates that the power adaptor supports a quick charging mode;
   and wherein the determining an initial charging parameter by the terminal according to the handshake information comprises:
      determining, by the terminal, that a charging mode of the initial charging parameter is the quick charging mode according to the first information of the handshake information.

4. The method of claim 3, wherein the receiving handshake information from a power adaptor further comprises:
   sending, by the terminal, second handshake information to the power adaptor; and
   receiving, by the terminal, a second handshake response message from the power adaptor, wherein the second handshake response message comprises second information of the handshake information, and the second information indicates a model or an identification of the power adaptor;
   and wherein the determining an initial charging parameter according to the handshake information by the terminal further comprises:
      determining, by the terminal, at least one of a charging voltage and a charging current of the initial charging parameter according to the second information of the handshake information.

5. The method of claim 1, wherein the handshake information comprises at least one of following information: a model of the power adaptor, an identification of the power adaptor, a work status of the power adaptor, a maximum output voltage supported by the power adaptor, a maximum output current support by the power adaptor, and a charging mode supported by the power adaptor.

6. The method of claim 1, wherein the initial charging parameter comprises at least one of following parameters: a charging mode, a charging voltage, and a charging current, wherein the charging mode comprises a quick charging mode and a normal charging mode.

7. The method of claim 1, wherein the determining an initial charging parameter according to the handshake information by the terminal comprises:
   determining, by the terminal, a charging parameter to be negotiated according to the handshake information;
   sending, by the terminal, a negotiation requesting message to the power adaptor, wherein the negotiation requesting message comprises the charging parameter to be negotiated;
   receiving, by the terminal, a negotiation response message determined based on the charging parameter to be negotiated from the power adaptor; and
   determining, by the terminal, the initial charging parameter according to the negotiation response message.

8. The method of claim 7, wherein the determining the initial charging parameter according to the negotiation response message by the terminal comprises:
   determining, by the terminal, the charging parameter to be negotiated as the initial charging parameter when the negotiation response message indicates that the power adaptor has confirmed the charging parameter to be negotiated;
   adjusting, by the terminal, the charging parameter to be negotiated according to an adjustment parameter of the negotiation response message when the negotiation response message indicates that the power adaptor has denied the charging parameter to be negotiated; and
   determining, by the terminal, the adjusted charging parameter to be negotiated as the initial charging parameter.

9. A communication method comprising:
   sending, by a power adaptor, handshake information to a terminal before the power adaptor charges the terminal;
   receiving, by the power adaptor, an initial charging parameter from the terminal, wherein the initial charging parameter is determined based on the handshake information by the terminal; and
   charging, by the power adaptor, the terminal according to the initial charging parameter.

10. The method of claim 9, wherein the sending handshake information to a terminal comprises:

receiving, by the power adaptor, a handshake requesting message from the terminal; and sending, by the power adaptor, a handshake response message to the terminal, wherein the handshake response message comprises the handshake information.

11. The method of claim 9, wherein the sending handshake information to a terminal comprises:

receiving, by the power adaptor, a first handshake requesting message from the terminal; and sending, by the power adaptor, a first handshake response message to the terminal, wherein the first handshake response message comprises first information of the handshake information, and the first information indicates that the power adaptor supports a quick charging mode.

12. The method of claim 11, wherein the sending handshake information to a terminal further comprises:

receiving, by the power adaptor, a second handshake requesting message from the terminal; and sending, by the power adaptor, a second handshake response message to the terminal, wherein the second handshake response message comprises second information of the handshake information, and the second information indicates a model or an identification of the power adaptor.

13. The method of claim 9, wherein the handshake information comprises at least one of following information: a model of the power adaptor, an identification of the power adaptor, a work status of the power adaptor, a maximum output voltage supported by the power adaptor, a maximum output current support by the power adaptor, and a charging mode supported by the power adaptor.

14. The method of claim 9, wherein the initial charging parameter comprises at least one of following parameters: a charging mode, a charging voltage, and a charging current, wherein the charging mode comprises a quick charging mode and a normal charging mode.

15. The method of claim 9, wherein before the power adaptor receives the initial charging parameter from the terminal, the method further comprises:

receiving, by the power adaptor, a negotiation requesting message from the terminal, wherein the negotiation requesting message comprises the charging parameter to be negotiated, and the charging parameter to be negotiated is determined based on the handshake information by the terminal;

determining, by the power adaptor, whether or not the power adaptor is able to charge the terminal according to the charging parameter to be negotiated and work parameters of the power adaptor;

sending, by the power adaptor, a negotiation response message to the terminal when the power adaptor is able to charge the terminal according to the charging parameter to be negotiated, wherein the negotiation response message indicates that the terminal determines the charging parameter to be negotiated as the initial charging parameter; and sending, by the power adaptor, a negotiation response message to the terminal when the power adaptor is not able to charge the terminal according to the charging parameter to be negotiated, wherein the negotiation response message comprises an adjustable parameter and instructs the terminal to adjust the initial charging parameter according to the adjustable parameter.

16. A terminal comprising:

a first transceiver unit configured to receive handshake information from a power adaptor before the terminal receives a charging current from the power adaptor;

a determining unit configured to determine an initial charging parameter according to the handshake information; and a second transceiver unit configured to send the initial charging parameter to the power adaptor to instruct the power adaptor to charge the terminal according to the initial charging parameter.

17. The terminal of claim 16, wherein the first transceiver unit is configured to send a handshake requesting message to the power adaptor, and receive a handshake response message from the power adaptor, wherein the handshake response message comprises the handshake information.

18. The terminal of claim 16, wherein the first transceiver unit is configured to send a first handshake requesting message to the power adaptor, and receive a first handshake response message from the power adaptor, wherein the first handshake response message comprises first information of the handshake information, and the first information indicates that the power adaptor supports a quick charging mode; the determining unit is configured to determine that a charging mode of the initial charging parameter is a quick charging mode according to the first information of the handshake information.

19. The terminal of claim 18, wherein the first transceiver unit is configured to send second handshake information to the power adaptor, and receive a second handshake response message from the power adaptor, wherein the second handshake response message comprises second information of the handshake information, and the second information indicates a model or an identification of the power adaptor; the determining unit is configured to determine at least one of a charging voltage and a charging current of the initial charging parameter according to the second information of the handshake information.

20. The terminal of claim 16, wherein the handshake information comprises at least one of following information: a model of the power adaptor, an identification of the power adaptor, a work status of the power adaptor, a maximum output voltage supported by the power adaptor, a maximum output current support by the power adaptor, and a charging mode supported by the power adaptor.

21. The terminal of claim 16, wherein the initial charging parameter comprises at least one of following parameters: a charging mode, a charging voltage, and a charging current, wherein the charging mode comprises a quick charging mode and a normal charging mode.

22. The terminal of claim 16, wherein the determining unit is configured to determine a charging parameter to be negotiated according to the handshake information, and send a negotiation requesting message to the power adaptor, wherein the negotiation requesting message comprises the charging parameter to be negotiated; the determining unit is configured to receive a negotiation response message determined based on the charging parameter to be negotiated from the power adaptor, and determine the initial charging parameter according to the negotiation response message.

23. The terminal of claim 22, wherein the determining unit is configured to determine the charging parameter to be negotiated as the initial charging parameter when the negotiation response message indicates that the power adaptor has confirmed the charging parameter to be negotiated, adjust the charging parameter to be negotiated according to an adjustment parameter of the negotiation response message when the negotiation response message indicates that the power adaptor has denied the charging parameter to be negotiated, and determine the adjusted charging parameter to be negotiated as the initial charging parameter.

24. A power adaptor comprising:
a first transceiver unit configured to send handshake information to a terminal before the power adaptor charges the terminal;
a second transceiver unit configured to receive an initial charging parameter from the terminal, wherein the initial charging parameter is determined based on the handshake information by the terminal; and
a charging unit configured to charge the terminal according to the initial charging parameter.

25. The power adaptor of claim 24, wherein the first transceiver unit is configured to receive a handshake requesting message from the terminal, and send a handshake response message to the terminal, wherein the handshake response message comprises the handshake information.

26. The power adaptor of claim 24, wherein the first transceiver unit is configured to receive a first handshake requesting message from the terminal, and send a first handshake response message to the terminal, wherein the first handshake response message comprises first information of the handshake information, and the first information indicates that the power adaptor supports a quick charging mode.

27. The power adaptor of claim 26, wherein the first transceiver unit is configured to receive a second handshake requesting message from the terminal, and send a second handshake response message to the terminal, wherein the second handshake response message comprises second information of the handshake information, and the second information indicates a model or an identification of the power adaptor.

28. The power adaptor of claim 24, wherein the handshake information comprises at least one of following information: a model of the power adaptor, an identification of the power adaptor, a work status of the power adaptor, a maximum output voltage supported by the power adaptor, a maximum output current support by the power adaptor, and a charging mode supported by the power adaptor.

29. The power adaptor of claim 24, wherein the initial charging parameter comprises at least one of following parameters: a charging mode, a charging voltage, and a charging current, wherein the charging mode comprises a quick charging mode and a normal charging mode.

30. The power adaptor of claim 24, wherein the power adaptor further comprises a negotiation unit configured to receive a negotiation requesting message from the terminal, wherein the negotiation requesting message comprises a charging parameter to be negotiated, and the charging parameter to be negotiated is determined based on the handshake information by the terminal; the negotiation unit is configured to determine whether or not the power adaptor is able to charge the terminal according to the charging parameter to be negotiated and work parameters of the power adaptor, send a negotiation response message when the power adaptor is able to charge the terminal according to the charging parameter to be negotiated, wherein the negotiation response message indicates that the terminal determines the charging parameter to be negotiated as the initial charging parameter, and send a negotiation response message to the terminal when the power adaptor is not able to charge the terminal according to the charging parameter to be negotiated, wherein the negotiation response message comprises an adjustable parameter and instructs the terminal to adjust the initial charging parameter according to the adjustable parameter.

* * * * *